US012704446B2

(12) United States Patent
Huston et al.

(10) Patent No.: US 12,704,446 B2
(45) Date of Patent: Aug. 11, 2026

(54) POWER CIRCULATING TEST SYSTEMS AND METHODS FOR WEAR TESTING

(71) Applicant: The Boeing Company, Arlington, VA (US)

(72) Inventors: Chase Huston, Sultan, WA (US); Chris Nelson, Gig Harbor, WA (US)

(73) Assignee: The Boeing Company, Arlington, VA (US)

( * ) Notice: Subject to any disclaimer, the term of this patent is extended or adjusted under 35 U.S.C. 154(b) by 428 days.

(21) Appl. No.: 18/452,907

(22) Filed: Aug. 21, 2023

(65) Prior Publication Data

US 2025/0067648 A1 Feb. 27, 2025

(51) Int. Cl.
*G01N 3/56* (2006.01)
*G01N 3/04* (2006.01)

(52) U.S. Cl.
CPC ................ *G01N 3/56* (2013.01); *G01N 3/04* (2013.01)

(58) Field of Classification Search
CPC .................................. G01N 3/04; G01N 3/56
USPC ........................................................... 73/808
See application file for complete search history.

(56) References Cited

U.S. PATENT DOCUMENTS

| | | | | |
|---|---|---|---|---|
| 11,093,663 | B2 | 8/2021 | James et al. | |
| 11,346,645 | B2 | 5/2022 | Ji et al. | |
| 2013/0085722 | A1* | 4/2013 | James | F16H 57/00 703/1 |
| 2023/0303052 | A1* | 9/2023 | Gesang | B60W 30/18 |

FOREIGN PATENT DOCUMENTS

| | | | | |
|---|---|---|---|---|
| CN | 115524147 | A | * 12/2022 | G01M 17/10 |
| CN | 109839350 | B | * 12/2023 | |
| KR | 20110112509 | A | * 10/2011 | G01M 17/007 |
| WO | WO-2021225133 | A1 | * 11/2021 | G01M 17/10 |

OTHER PUBLICATIONS

Translation_CN115524147 (Year: 2022).*
Translation KR-20110112509 "Park" (Year: 2011).*

(Continued)

*Primary Examiner* — Peter J Macchiarolo
*Assistant Examiner* — Monica S Young
(74) *Attorney, Agent, or Firm* — Walters & Wasylyna LLC

(57) ABSTRACT

A system includes a power-circulating transmission having a plurality of transmission components arranged in series to circulate motion along a continuous loop and a test article coupled to the power-circulating transmission. The system includes a clutch, a brake, a starting-torque motor, a running motor, and a running-torque motor. The brake selectively couples or decouples the transmission components such that the power-circulating transmission is in an engaged or disengaged power-circulating state. The brake selectively inhibits motion of one of the transmission components when the power-circulating transmission is in the disengaged power-circulating state. The starting-torque motor applies a static torque load to the power-circulating transmission. The running motor applies power to the power-circulating transmission to drive the motion along the continuous loop. The running-torque motor applies a dynamic torque load to the power-circulating transmission.

20 Claims, 12 Drawing Sheets

(56) References Cited

OTHER PUBLICATIONS

Manoj et al: "Development of a Power Re-Circulating Gear Test Rig," *Department of Mechanical Engineering* (2003).
Mozafari et al: "Design of a Mechanically Closed-Loop Test Rig for Testing Aviation Industry's Gearboxes," *Vilnius Gediminas Technical University* (*VGTU*) *Press* (2017).
Lee et al: "Design of a Mechanical Power Circulation Test Rig for a Wind Turbine Gearbox," *Applied Sciences* (May 2020).
Akerblom: "Gear Test Rig for Noise and Vibration Testing of Cylindrical Gears," *Volvo Construction Equipment Components AB*.

* cited by examiner 100
112
114
124
144
132
136
116
142
118
126
140
130
108
102
134
138
106
128
122
104
110

100
112
114
124
144
132
136
116
142
118
126
140
130
108
102
134
106
138
128
122
104
110

1200
AIRCRAFT
SYSTEMS
1204
1202 AIRFRAME
1206 INTERIOR
1208 PROPULSION
ELECTRICAL 1210
HYDRAULIC
1212
ENVIRONMENTAL 1214
CONTROL 1216

POWER CIRCULATING TEST SYSTEMS AND METHODS FOR WEAR TESTING

FIELD

The present disclosure relates generally to testing systems and methods and, more particularly, to systems and methods for testing performance and endurance of power-transmission assemblies and torque-transmission assemblies.

BACKGROUND

Power-transmission assemblies and torque-transmission assemblies, such as gears and other rotary unions, are used in all kinds of machinery. Performance and endurance of these assemblies depend on a number of factors, which can make it difficult to accurately predict service life. Power re-circulating test rigs have been developed to test and evaluate the performance and/or resistance to wear of such assemblies. However, conventional test rigs have limited loading conditions and typically require significant labor and time to set up each test. Accordingly, those skilled in the art continue with research and development efforts in the field of wear testing of power-transmission and torque-transmission assemblies.

SUMMARY

Disclosed are examples of a system for wear testing and a method for wear testing. The following is a non-exhaustive list of examples, which may or may not be claimed, of the subject matter according to the present disclosure.

In an example, the disclosed system includes a power-circulating transmission. The power-circulating transmission includes a plurality of transmission components that are arranged in series to circulate motion along a continuous loop. A test article is coupled to the power-circulating transmission along the continuous loop. The system includes a clutch to selectively couple or decouple a first one of the transmission components and a second one of the transmission components such that the power-circulating transmission is in an engaged power-circulating state or a disengaged power-circulating state. The system includes a brake to selectively inhibit motion of the first one of the transmission components when the power-circulating transmission is in the disengaged power-circulating state. The system includes a starting-torque motor that applies a static torque load to the power-circulating transmission when the power-circulating transmission is in the disengaged power-circulating state. The system includes a running motor that applies power to the power-circulating transmission to drive the motion along the continuous loop when the power-circulating transmission is in the engaged power-circulating state.

In another example, the disclosed system includes a power-circulating transmission. The power-circulating transmission includes a plurality of transmission components that are arranged in series to circulate motion along a continuous loop. The toothed test article is coupled to the power-circulating transmission along the continuous loop. They system includes a running motor that applies power to the power-circulating transmission to drive the motion along the continuous loop. The system includes a running-torque motor that applies a dynamic torque load to the power-circulating transmission.

In another example, the disclosed system includes a power-circulating transmission. The power-circulating transmission includes a plurality of transmission components that are arranged in series to circulate motion along a continuous loop. A test article is coupled to the power-circulating transmission along the continuous loop. The system includes a clutch to selectively couple or decouple a first one of the transmission components and a second one of the transmission components such that the power-circulating transmission is in an engaged power-circulating state or a disengaged power-circulating state. The system includes a brake to selectively inhibit motion of the first one of the transmission components when the power-circulating transmission is in the disengaged power-circulating state. The system includes a starting-torque motor that applies a static torque load to the power-circulating transmission when the power-circulating transmission is in the disengaged power-circulating state. The system includes a running motor that applies power to the power-circulating transmission to drive the motion along the continuous loop when the power-circulating transmission is in the engaged power-circulating state. The system includes a running-torque motor that applies a dynamic torque load to the power-circulating transmission.

In an example, the disclosed method includes steps of: (1) coupling a test article to a power-circulating transmission that includes a plurality of transmission components that are arranged in series to circulate motion along a continuous loop; (2) decoupling a first one of the transmission components and a second one of the transmission components such that the power-circulating transmission is in a disengaged power-circulating state; (3) with the power-circulating transmission in the disengaged power-circulating state, inhibiting motion of the first one of the transmission components; (4) with the power-circulating transmission in the disengaged power-circulating state, applying a static torque load to the power-circulating transmission using a starting-torque motor; (5) coupling the first one of the transmission components and the second one of the transmission components such that the power-circulating transmission is in an engaged power-circulating state; (6) with the power-circulating transmission in the engaged power-circulating state, enabling motion of the first one of the transmission components; (7) with the power-circulating transmission in the engaged power-circulating state, applying power to the power-circulating transmission using a running motor; and (8) circulating motion along the continuous loop.

Other examples of the system and the method will become apparent from the following detailed description, the accompanying drawings, and the appended claims.

DETAILED DESCRIPTION

Figure 1:
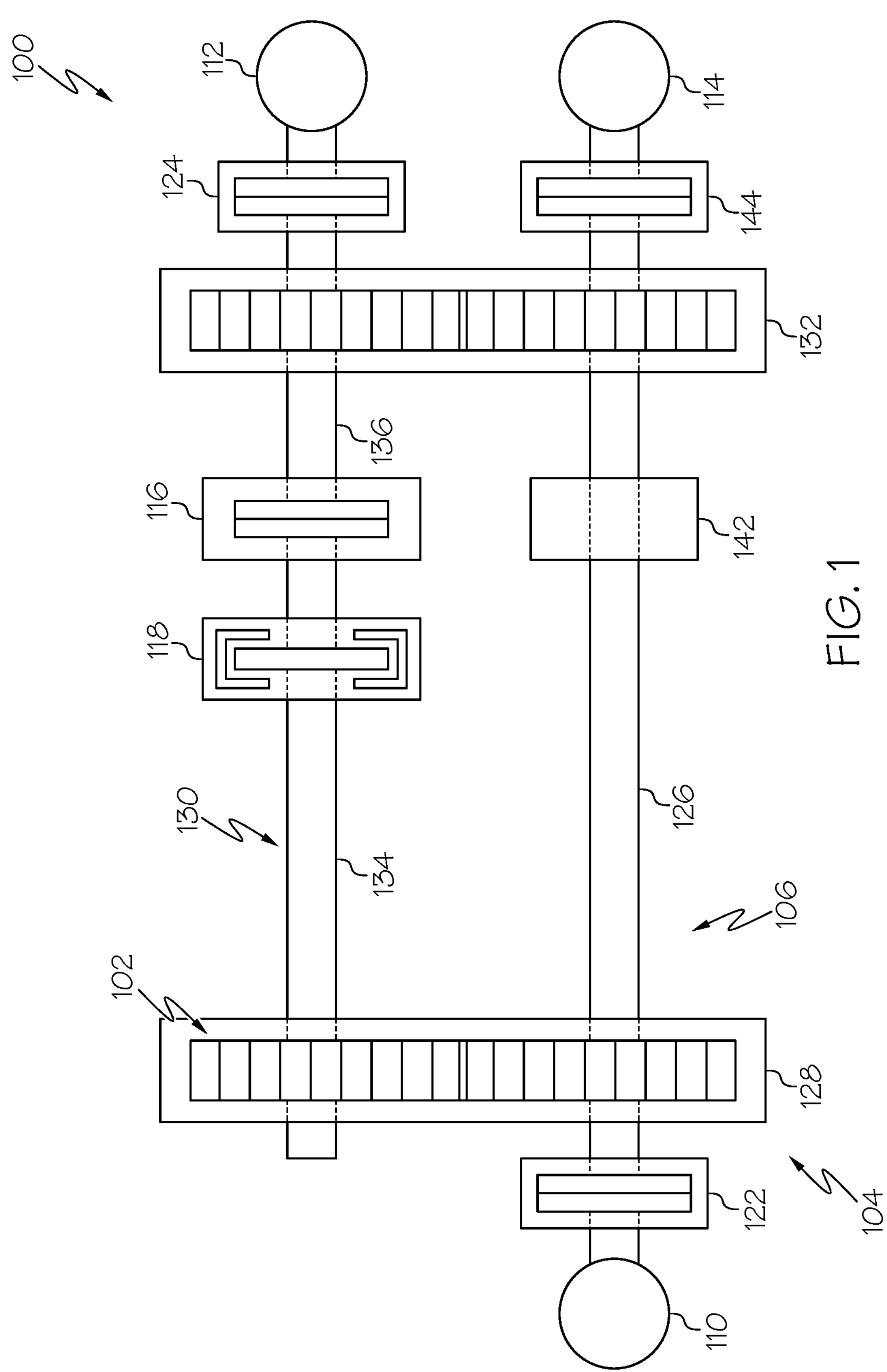
FIG. 1 is a schematic illustration of an example of a power-circulating system for wear testing.

Referring generally to FIGS. 1-11, by way of examples, the present disclosure is directed to a system 100 and a method 1000 for testing wear of a test article 102. The system 100 and method 1000 enable a single, low torque motor to drive circulating motion within a looped mechanical circuit of a test rig that requires high torque.

The present disclosure recognizes that high torque and high speed are required to effectively perform a rotational wear test on a test article. However, a common problem with conventional power-circulating test rigs is that speed is necessarily sacrificed for torque and torque is necessarily sacrificed for speed. Examples of the system 100 and the method 1000 described herein resolve this problem by effectively adding a starting (e.g., initial) torque to the looped mechanical circuit of the test rig, locking the initial torque in test rig, and then driving the test rig with a drive motor at a lower torque. Because the initial torque is loaded and locked into the test rig prior to engagement of a drive motor, a smaller drive motor can be used and only needs to oppose and overcome friction within the test rig to rotate. Thus, the high torque in the mechanical circuit remains.

The present disclosure also recognizes that power-circulating test rigs require many cycles to be imposed on a test article to adequately test performance and wear (e.g., endurance to wear). As the cycle count increases, wear on the test article and test rig in turn begins to increase. As the wear increases, the torque load embedded (e.g., the torque initially loaded and locked) within the test rig decreases due to tolerances in parts increasing. Examples of the system 100 and the method 1000 described herein address this problem by introducing an additional running torque into the test rig to maintain the torque within a specified or desired range via a closed-loop torque control.

In the various examples described and illustrated herein, the test article 102 being evaluated using the system 100 and/or according to the method 1000 can include or take the form of any one or various suitable types of power-transmission assemblies, motion-transmission assemblies, and/or torque-transmission assemblies, such as gears, splines, shaft couplings, rotary unions, constant-velocity joints, universal joints, and the like.

In one or more examples, the test article 102 includes a torque-transfer interface having at least two mating or complementary components that transfer torque, power, and/or rotary motion between interfacing parts of a machine, vehicle, or the like. In one or more examples, the torque-transfer interface of the test article 102 includes or takes the form of a toothed torque-transfer interface in which each component of the torque-transfer interface includes a plurality of teeth and grooves. In one or more examples, the components of the torque-transfer interface transfer torque using one tooth at a time. In one or more examples, the components of the torque-transfer interface use all teeth and grooves to simultaneously transfer torque. In one or more examples, the torque-transfer interface includes or takes the form of a mechanical coupling or union that allows the shafts to rotate freely as the angle between the two shafts moves within a certain range or for connecting rigid shafts whose axes are inclined to each other.

Generally, the system 100 takes the form of an advanced power circulation test rig that provides quick wear testing of various types of power-transmission assemblies, motion-transmission assemblies, and/or torque-transmission assemblies, such as gears, splines, and other rotary unions. In one or more examples, the system 100 includes a power-circulating transmission 104 and a combination of a running motor 110, a starting-torque motor 112, and a running-torque motor 114. In one or more examples, the running motor 110 is a power-circulating drive motor that is configured to induce motion (e.g., spin) the system 100. In one or more examples, a control loop is configured to monitor and control a desired or targeted rotational speed. In one or more examples, the operational speed (e.g., revolutions per minute) of the system 100 is controlled using a proportional-integrated-derivative controller (PID controller). In one or more examples, the starting-torque motor 112 is a windup torque motor that is configured to produce an initial torque load in the test article 102. In one or more examples, the running-torque motor 114 is a drag motor that is configured to provide makeup torque during continuous operation of the system 100.

In one or more examples, the initial (e.g., windup or starting) torque is mechanically induced by the starting-torque motor 112. The initial torque is locked into a looped mechanical circuit formed by the power-circulating transmission 104 of the system 100. Locking an initial torque load into the power-circulating transmission 104 enables the source or driver of the initial torque (e.g., the starting-torque motor 112) to be removed, while enabling the torsional load to remain in the power-circulating transmission 104 and the test article 102. This example configuration enables the running motor 110 and the running-torque motor 114 to be significantly smaller than the starting-torque motor 112 because the starting-torque motor 112 and the running-torque motor 114 only need to overcome frictional losses (e.g., approximately 8%) of the system 100 to drive the closed-loop mechanical circuit at any suitable or desired speed. The system 100 can operate any a wide range of speeds, for example, from approximately 10 RPM and to approximately 10,000 RPM or even up to approximately 30,000 RPM.

In one or more examples, as wear occurs in the test article 102 and/or the power-circulating transmission 104, the mechanical circuit will relax and slowly lose the initial torque. In one or more examples, the system 100 is configured to continuously measure or periodically measure the torque in the mechanical circuit. The running-torque motor 114 is configured to continuously add or periodically add an additional (e.g., make-up) torque load to compensate for losses resulting from wear, as needed, based on the measured torque load and instructions from the PID control loop. Eventually, the system 100 may wear to a point where the system 100 is temporarily shut down for an operator controlled or an automated re-torquing operation.

Examples of the system 100 and the method 1000 are directed to an advanced power circulation test rig that allows for quick wear testing of various types of power-transmission assemblies and torque-transmission assemblies. The system 100 may also be referred to as a power-circulation test system, a power re-circulating test system, power-circulation test rig, or a power re-circulating test rig. The system 100 includes a mechanical drive circuit, formed by the test article 102 and the power-circulating transmission 104, and the combination of motors (e.g., the running motor 110 and one or more of the starting-torque motor 112 and the running-torque motor 114).

In one or more examples of the system 100 and the method 1000, an initial starting torque is applied to the mechanical drive circuit using the starting-torque motor 112. Prior to the starting torque being applied to the mechanical drive circuit, all the motors are disengaged from the mechanical drive circuit. The power-circulating transmission 104 includes a coupling mechanism that is located along the mechanical drive circuit. Prior to the starting torque being applied to the mechanical drive circuit, the coupling mechanism is disengaged, thereby opening the mechanical drive circuit. With the mechanical drive circuit open, a braking mechanism is applied to the mechanical drive circuit. With the mechanical drive circuit open and the brake applied, the starting-torque motor 112 is engaged with the mechanical drive circuit. The starting-torque motor 112 is actuated to induce the starting torque within the mechanical drive circuit. In some examples, the torque that is initially loaded within the mechanical drive circuit is measured, for example, via a torque sensor. A closed-loop feedback control is used to easily apply, control, and maintain a target torque value. With the starting torque applied to the mechanical drive circuit, the coupling mechanism is re-engaged, thereby closing the mechanical drive circuit. The starting-torque motor 112 is disengaged from the mechanical drive circuit and the braking mechanism is released. The system 100 now has an initial torque load embedded within the mechanism drive circuit. With the mechanical drive circuit closed, the braking mechanism released, and the torque load embedded in the mechanism drive circuit, the running motor 110 is engaged with the mechanism drive circuit. The running motor 110 is actuated to apply power to the mechanism drive circuit and drive motion along the mechanism drive circuit. The closed-loop feedback control continuously monitors the torque within the mechanical drive circuit. Additional torque can be applied to the mechanical drive circuit, as needed, using the running-torque motor 114. The running-torque motor 114 is engaged with the mechanical drive circuit and is actuated to induce an additional running torque within the mechanical drive circuit, thereby compensating for internal losses and maintaining a desired or target torque and speed in the system 100.

Accordingly, in various examples, the system 100 is a powered, closed-loop controlled test rig that selectively controls both torque and speed. The present disclosure recognizes that conventional power circulating rigs utilize a low-torque motor to drive a system that requires high torque. The various examples of the system 100 and the method 1000 described herein overcome this deficiency and facilitate efficient testing of power-transmission assemblies, motion-transmission assemblies, and/or torque-transmission assemblies, such as gears, splines, or other rotary couplings. In one or more examples, the system 100 and the method 1000 also enable automation of wear testing operations by automatically inducing an initial starting torque using the starting-torque motor 112, a clutch 116, and a brake 118. In one or more examples, the system 100 and the method 1000 also facilitate automatic addition of makeup torque as needed in response to wear in the test article 102 or the mechanical circuit. The system 100 and the method 1000 further provide a better torque control and reduce downtime for higher test efficiency.

Referring now to FIGS. 1-10, disclosed are examples of the system 100 for wear testing the test article 102. The system 100 includes a number of elements, features, and components. The following are examples of the system 100, according to the present disclosure. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIGS. 1-10, in one or more examples, the system 100 includes the power-circulating transmission 104. The power-circulating transmission 104 includes a plurality of transmission components 106. The transmission components 106 are arranged in series to circulate motion along a continuous loop 108 (e.g., FIGS. 2 and 4). The test article 102 is coupled to the power-circulating transmission 104 along the continuous loop 108. In one or more examples, the transmission components 106 of the power-circulating transmission 104 and the test article 102 form a mechanical drive circuit that circulates motion along the continuous loop 108.

In one or more examples, the initial torque is applied to the power-circulating transmission 104 by twisting or rotating one of the transmission components 106 relative to another one of the transmission components 106. As an example, the power-circulating transmission 104 is loaded by decoupling a first one of the transmission components 106 from a second one of the transmission components 106, locking the first one of the transmission components 106 in position such that it is not able to rotate, and rotating the second one of the transmission components 106 relative to the first one of the transmission components 106. The torque load is locked in the power-circulating transmission 104 by recoupling the first one of the transmission components 106 and the second one of the transmission components 106.

In one or more examples, the transmission components 106 of the power-circulating transmission 104 include at least a first gear box 128, a second gear box 132, a first shaft 126, and a second shaft 130. The first gear box 128 includes at least two gears. The second gear box 132 includes at least two gears. The first gear box 128 and the second gear box 132 are spaced apart and connected by the first shaft 126 and the second shaft 130. The first shaft 126 extends between and is coupled to the first gear box 128 and to the second gear box 132. The second shaft 130 extends between and is coupled to the first gear box 128 and to the second gear box 132. The gears of the first gear box 128 transmit power, torque, and rotary motion from the first shaft 126 to the second shaft 130. The gears of the second gear box 132 transmit power, torque, and rotary motion from the second shaft 130 to the first shaft 126. As such, the first gear box 128 and the second gear box 132 enable simultaneous rotation of the first shaft 126 and the second shaft 130 along the continuous loop 108.

In one or more examples, the second shaft 130 includes a second-shaft first section 134 and a second-shaft second section 136. The initial torque is applied to the power-circulating transmission 104 by twisting or rotating the second-shaft second section 136 relative to the second-shaft first section 134. For example, the power-circulating transmission 104 is loaded by decoupling the second-shaft first section 134 from the second-shaft second section 136, locking the second-shaft first section 134 in position such that it is not able to rotate, and rotating the second-shaft second section 136 relative to the second-shaft first section 134. The torque load is locked in the power-circulating transmission 104 by recoupling the second-shaft first section 134 and the second-shaft second section 136.

In one or more examples, the second-shaft first section 134 includes or takes the form of a spring shaft, such as a torsion spring shaft. In these examples, with an end of the second-shaft first section 134 locked in position, the second-shaft first section 134 resists rotation and stores potential energy in response to application of the initial static torque load.

In one or more examples, the test article 102 is located between and is coupled to two directly adjacent ones of the transmission components 106. As an example, the test article 102 is located between and is coupled to a third one of the transmission components 106 and the fourth one of the transmission components 106, which is mated with third one of the transmission components 106. As such, when the initial torque is applied to or induced in the power-circulating transmission 104, the torque load is applied to or induced in the test article 102. As an example, the initial torque is generated by rotating the second-shaft second section 136 and is, in turn, transmitted through the second gear box 132, the first shaft 126, and the first gear box 128 to the second-shaft first section 134, which is locked and unable to rotate.

Referring to FIGS. 1-6, in one or more examples, the test article 102 is integrated within one of the first gear box 128 or the second gear box 132. In these examples, the test article 102 can be a gear set or an assembly of two or more gears.

Referring to FIGS. 7-10, in one or more examples, the first shaft 126 includes a first-shaft first section 138 and a first-shaft second section 140. The test article 102 is coupled between the first-shaft first section 138 and the first-shaft second section 140. In these examples, the test article 102 can be a spline, a rotary union, a joint, and the like.

Referring to FIGS. 1-9, in one or more examples, the system 100 includes the clutch 116. The clutch 116 selectively couples or decouples one (e.g., a first one) of the transmission components 106 and another one (e.g., a second one) of the transmission components 106 such that the power-circulating transmission 104 is in one of an engaged power-circulating state or a disengaged power-circulating state.

Figure 2:
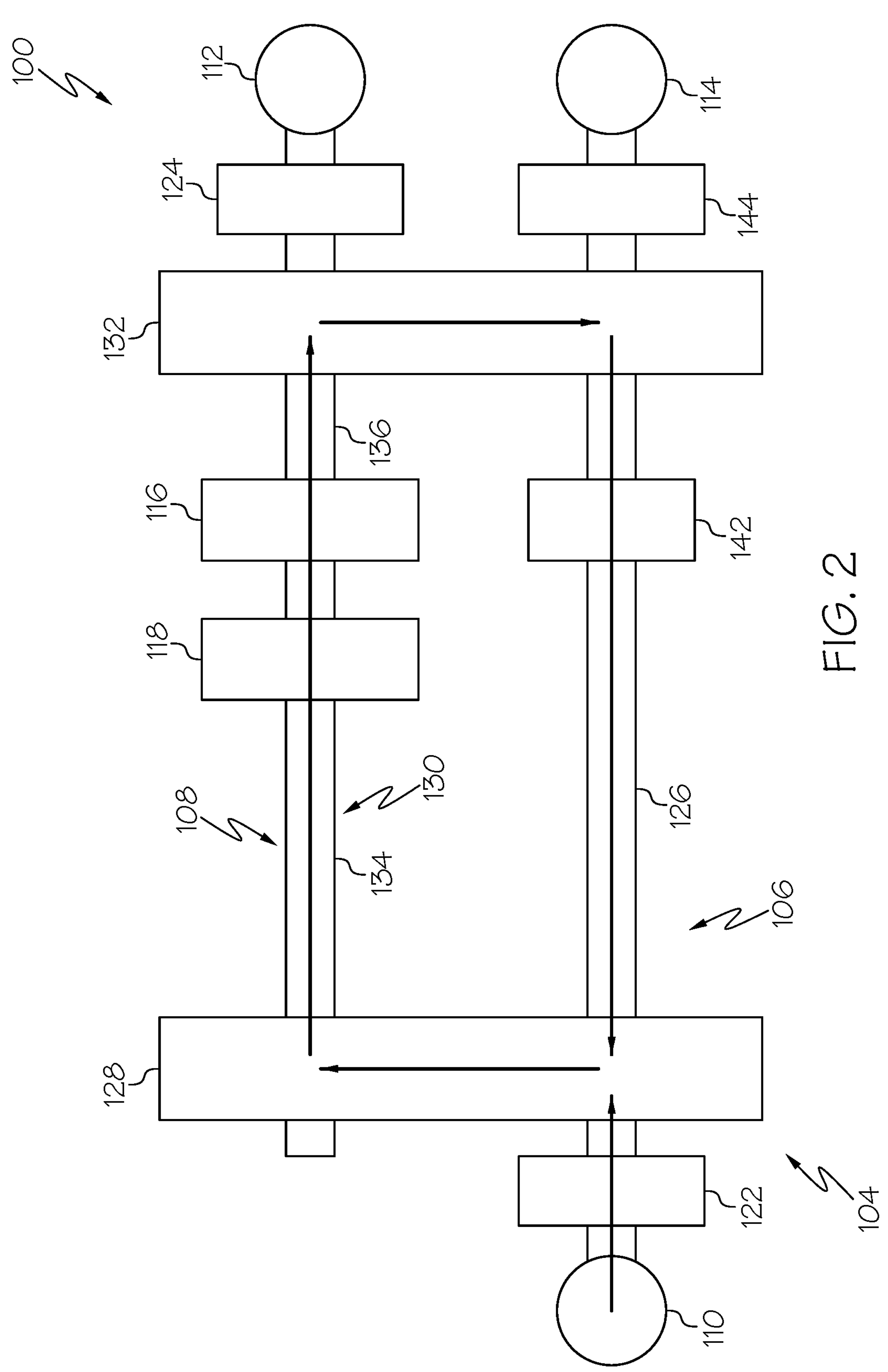
FIG. 2 is a schematic illustration of an example of the system depicted in an engaged power-circulating state.
Figure 3:
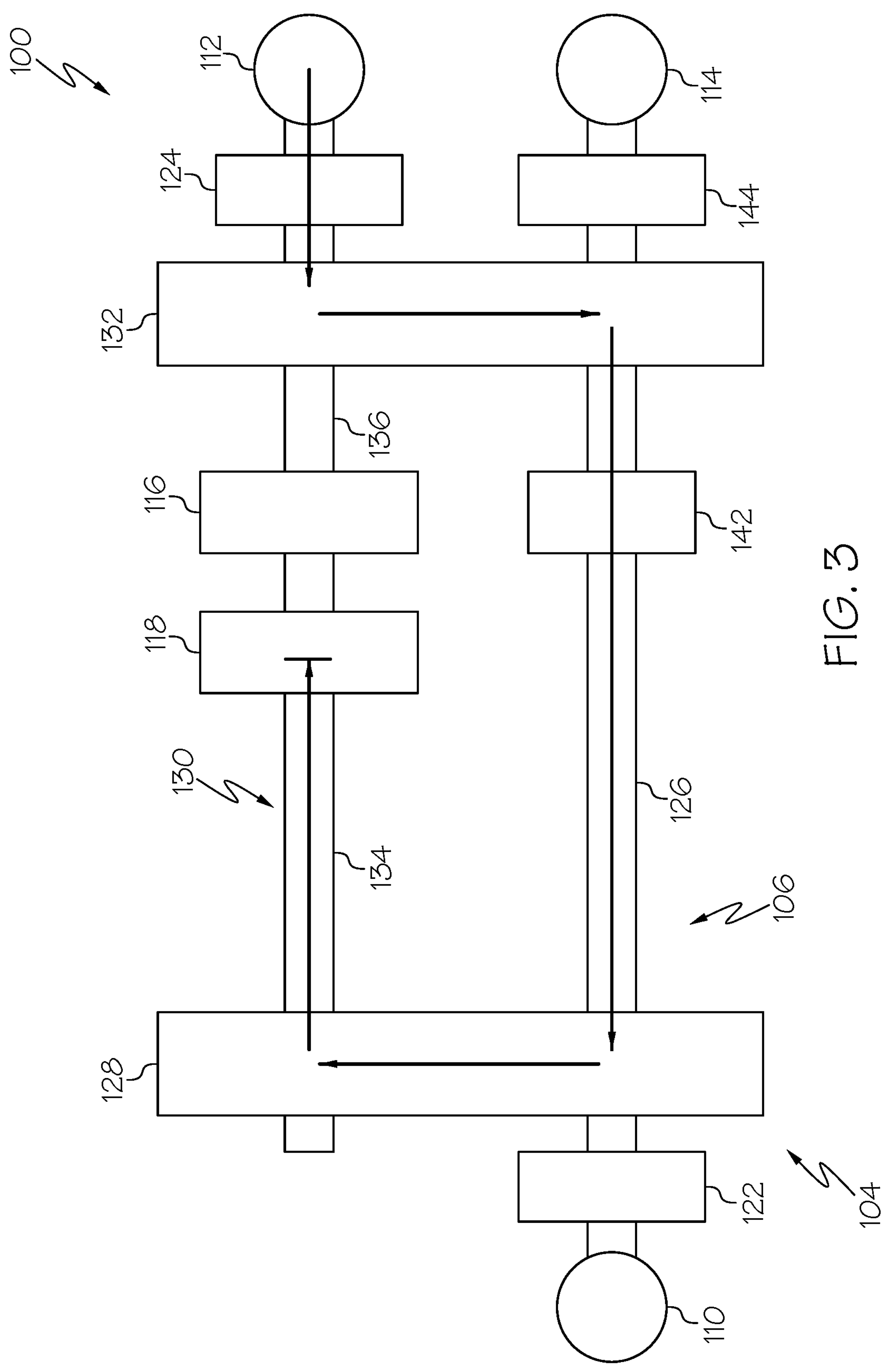
FIG. 3 is a schematic illustration of an example of the system depicted in a disengaged power-circulating state.
Figure 4:
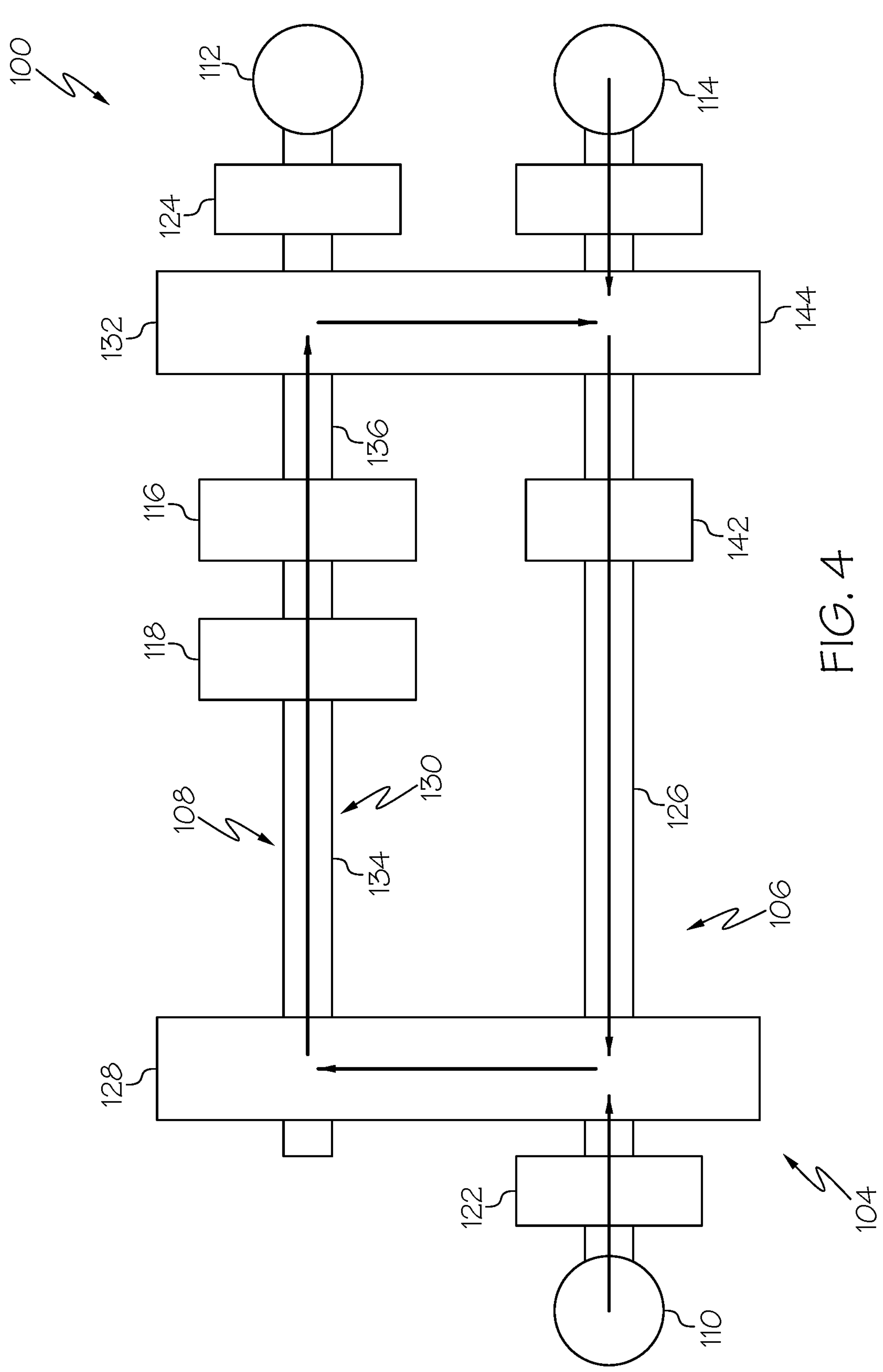
FIG. 4 is a schematic illustration of an example of the system depicted in the engaged power-circulating state.
Figure 5:
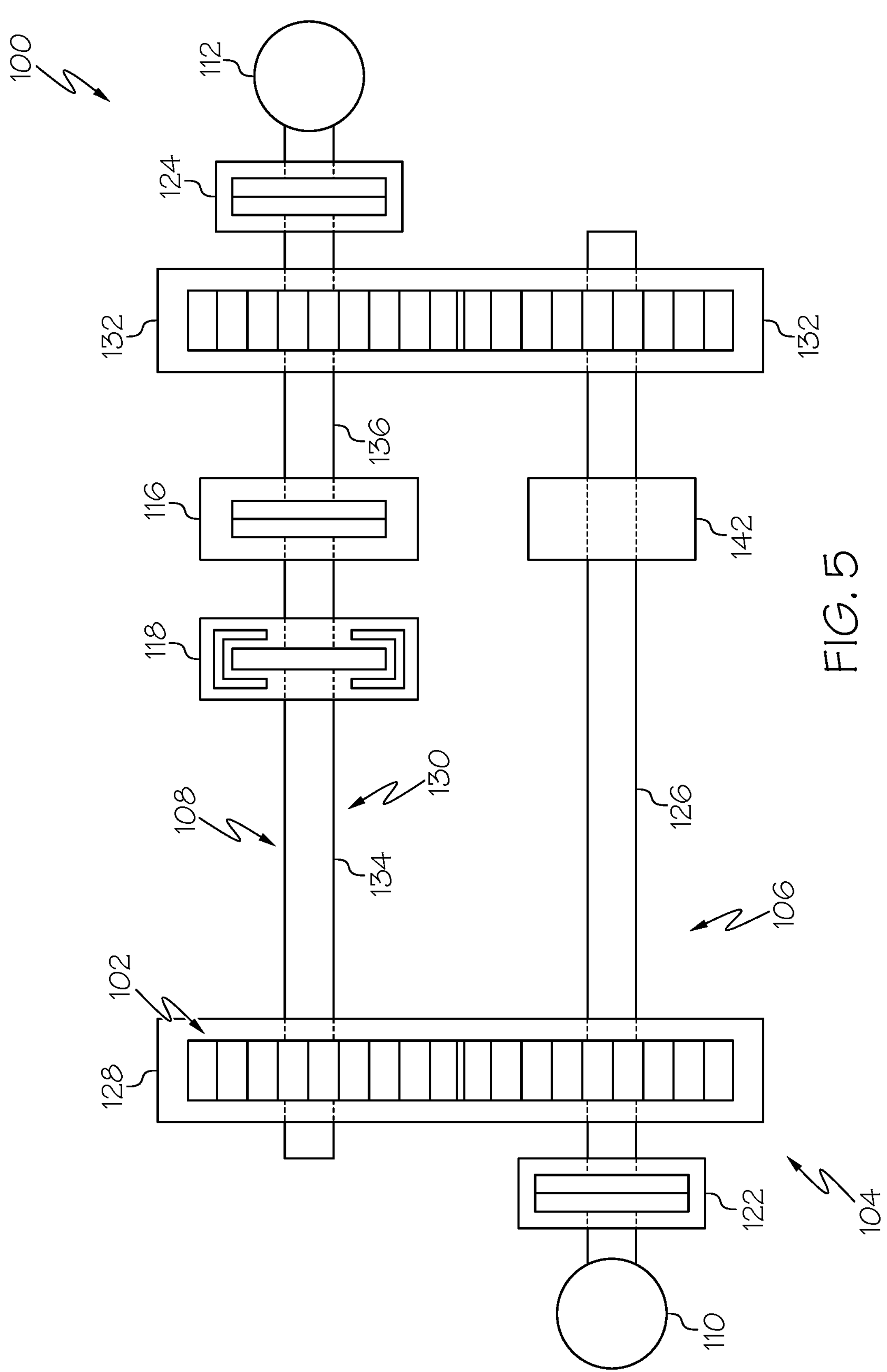
FIG. 5 is a schematic illustration of an example of the system.
Figure 6:
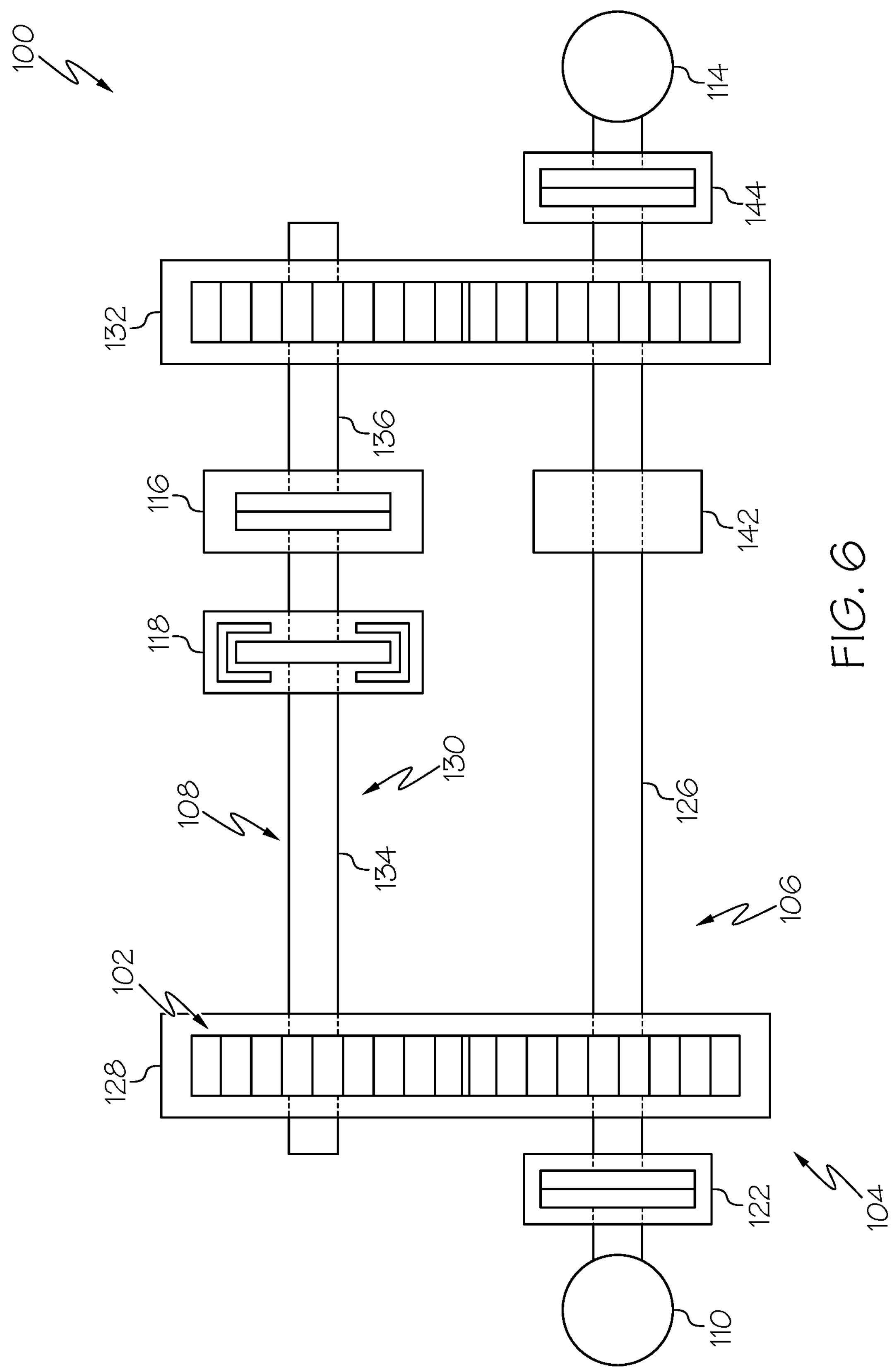
FIG. 6 is a schematic illustration of an example of the system.
Figure 7:
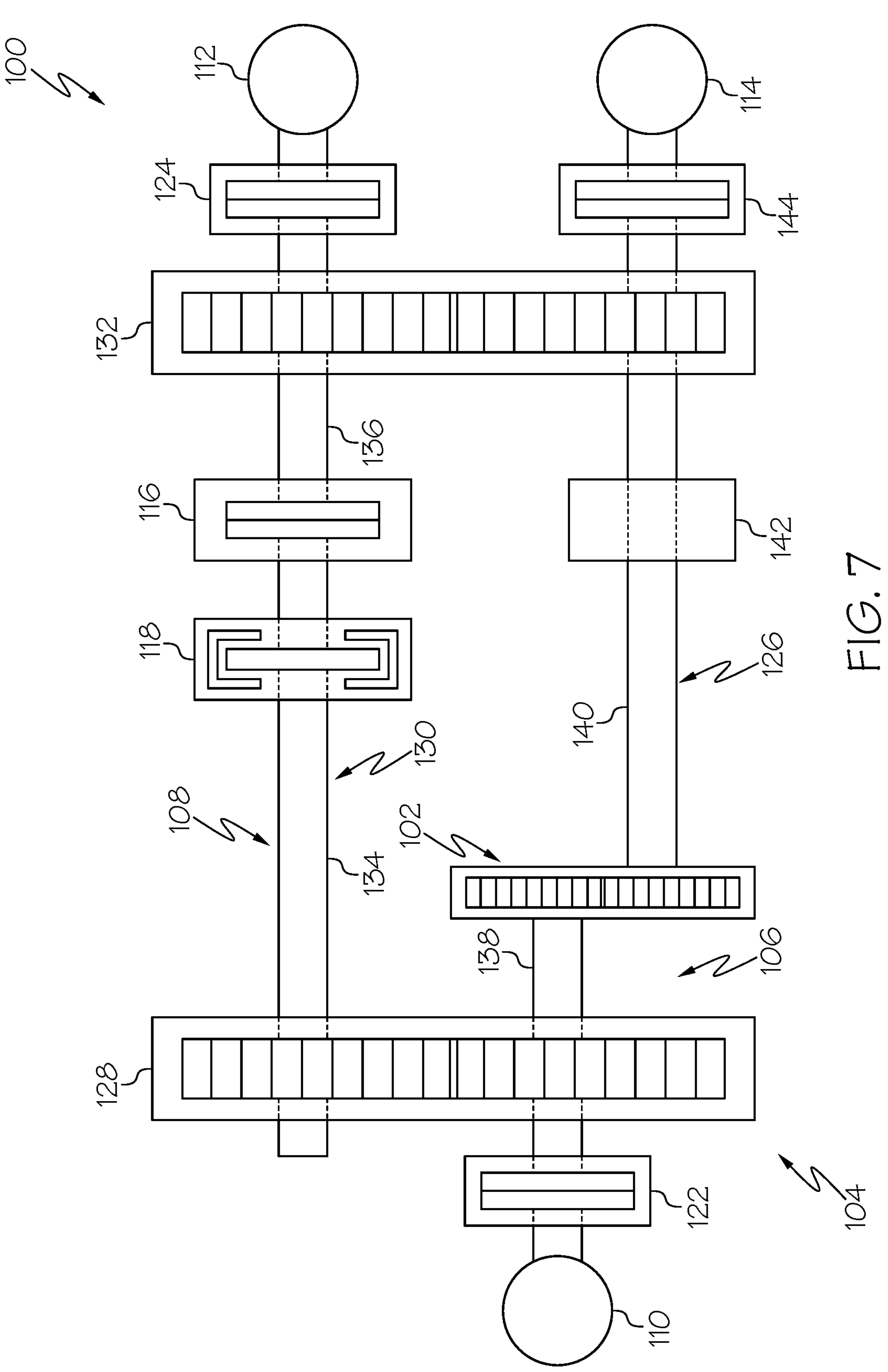
FIG. 7 is a schematic illustration of an example of the system.
Figure 8:
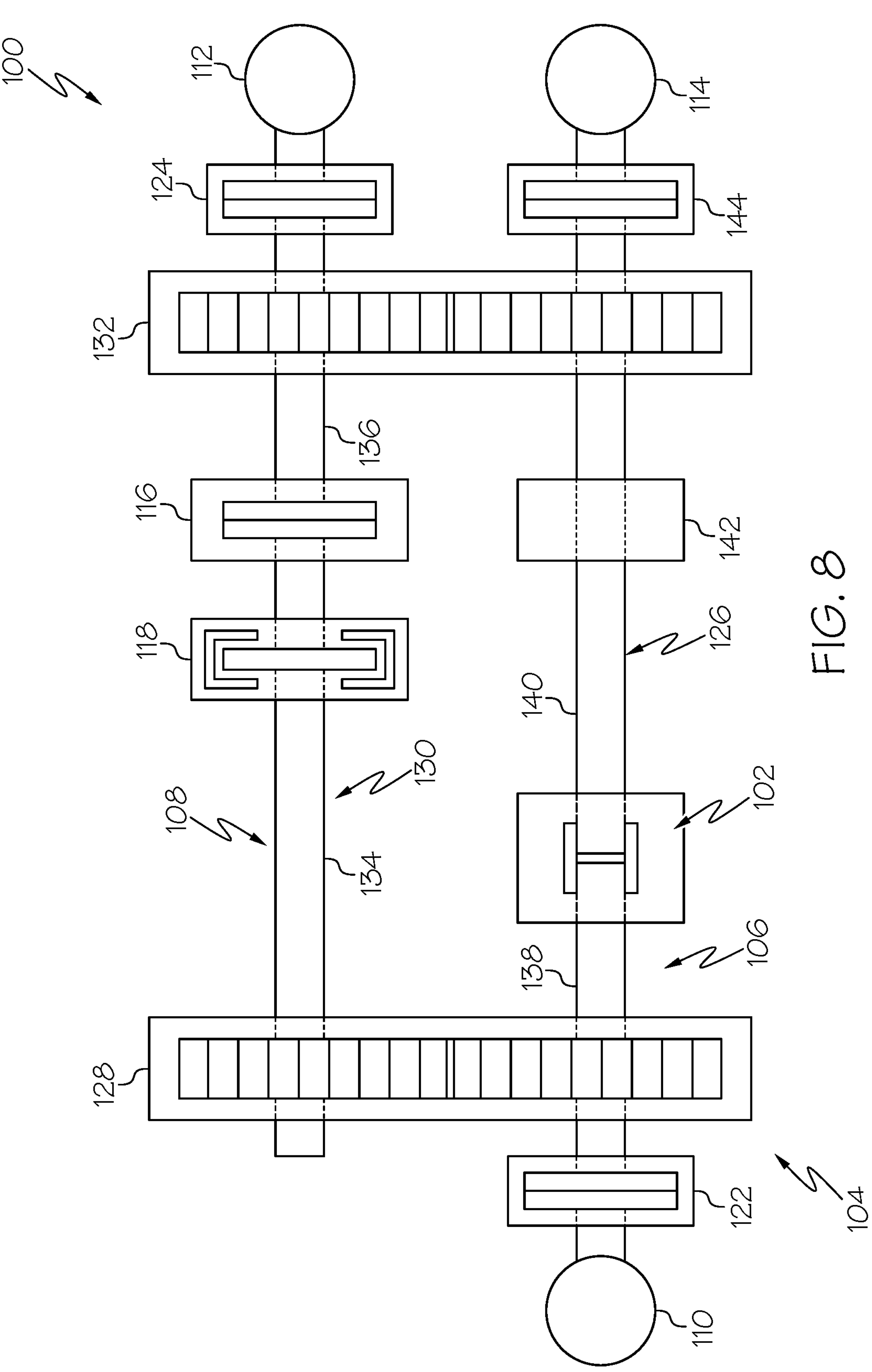
FIG. 8 is a schematic illustration of an example of the system.

In the engaged power-circulating state, the power-circulating transmission 104 forms a closed mechanical drive circuit (e.g., a mechanically closed loop) such that power and motion circulate through the transmission components 106 (e.g., around the continuous loop 108 of the power-circulating transmission 104 as shown in FIGS. 2 and 4). In the disengaged power-circulating state, the power-circulating transmission 104 forms an open mechanical drive circuit (e.g., a mechanically open loop) such that power does not circulate through the transmission components 106 (e.g., around the continuous loop 108 of the power-circulating transmission 104 as shown in FIG. 3).

In one or more examples, the clutch 116 is located along the second shaft 130. As an example, the clutch 116 is configured to selectively couple or decouple the second-shaft first section 134 and the second-shaft second section 136. Coupling the second-shaft first section 134 and the second-shaft second section 136 using the clutch 116 closes the mechanical drive circuit such that power and motion circulate through the power-circulating transmission 104, thereby configuring the power-circulating transmission 104 in the engaged power-circulating state. Decoupling the second-shaft first section 134 and the second-shaft second section 136 using the clutch 116 opens the mechanical drive circuit such that power does not circulate through the power-circulating transmission 104, thereby configuring the power-circulating transmission 104 in the disengaged power-circulating state.

In one or more examples, the clutch 116 is any suitable mechanical device or coupling mechanism capable of selectively coupling two of the transmission components 106 together and selectively decoupling the two of the transmission components 106 from each other, such as selectively coupling and decoupling mating ends of the second-shaft first section 134 and the second-shaft second section 136. In one or more examples, the clutch 116 couples and decouples the mating ends of the second-shaft first section 134 and the second-shaft second section 136 by selectively engaging or separating rotating surfaces. In one or more examples, the clutch 116 includes any one of various types of clutches, including, but not limited to, a friction clutch, a hydraulic clutch, an electromagnetic clutch, and the like. In one or more examples, actuation (e.g., engagement and disengagement) of the clutch 116 is performed manually. In one or more examples, actuation (e.g., engagement and disengagement) of the clutch 116 is performed automatically, such as under the direction of computer control.

Referring to FIGS. 1-9, in one or more examples, the system 100 includes the brake 118. The brake 118 selectively inhibits motion of at least one (e.g., the first one) of the transmission components 106 relative to at least another one (e.g., the second one) of the transmission components 106. The brake 118 is configured to inhibit motion of one of the transmission components 106 when the power-circulating transmission 104 is in the disengaged power-circulating state (e.g., as shown in FIG. 3).

In one or more examples, the brake 118 is located along the second shaft 130, for example, between the clutch 116 and first gear box 128 of the power-circulating transmission 104. As an example, the brake 118 is configured to selectively engage the second-shaft first section 134, thereby selectively inhibiting rotary motion of the second-shaft first section 134 relative to the second-shaft second section 136 following decoupling of the second-shaft first section 134 and the second-shaft second section 136 using the clutch 116.

Referring to FIGS. 1-10, in one or more examples, the system 100 includes the running motor 110. The running motor 110 applies power to the power-circulating transmission 104 to drive the motion along the continuous loop 108 (e.g., spin or rotate the transmission components 106). The running motor 110 is configured to apply power to and drive motion of the transmission components 106 of the power-circulating transmission 104 when the power-circulating transmission 104 is in the engaged power-circulating state. In one or more examples, the running motor 110 is coupled to the first shaft 126. In one or more examples, the running motor 110 is coupled to one of the gears of the first gear box 128.

Referring to FIGS. 1-10, in one or more examples, the system 100 includes a running-motor clutch 122. The running-motor clutch 122 selectively engages or disengages the running motor 110 from the power-circulating transmission 104. The running motor 110 is disengaged during application of the initial static torque. The running motor 110 is engaged during application of power to the power-circulating transmission 104.

In one or more examples, the running motor 110 includes a pneumatic motor. In one or more examples, the running motor 110 includes a hydraulic motor. In one or more examples, the running motor 110 includes an electric motor. In one or more examples, the running motor 110 operates at a set rotational speed (e.g., RPM) and set torque. The running motor 110 is configured to have the capacity to overcome losses in the power-circulating transmission 104.

Referring to FIGS. 1-5 and 7-10, in one or more examples, the system 100 includes the starting-torque motor 112. The starting-torque motor 112 applies a static torque load to the power-circulating transmission 104. The starting-torque motor 112 is configured to apply the static torque load when the power-circulating transmission 104 is in the disengaged power-circulating state. In one or more examples, the starting-torque motor 112 is coupled to the second shaft 130. In one or more examples, the starting-torque motor 112 is coupled to one of the gears of the second gear box 132.

The static torque load refers to the initial or starting torque that is applied to the mechanical drive circuit while the power-circulating transmission 104 is in the disengaged power-circulating state and in a static condition without power and motion being applied to the power-circulating transmission 104 by the running motor 110.

In one or more examples, the clutch 116 selectively decouples the second-shaft first section 134 from the second-shaft second section 136, the brake 118 selectively inhibits motion of the second-shaft first section 134 relative to the second-shaft second section 136, and the starting-torque motor 112 rotates the second-shaft second section 136 relative the second-shaft first section 134 to apply the static torque load (e.g., the initial starting torque) in the system 100. Subsequently, with the power-circulating transmission 104 statically loaded, the clutch 116 selectively couples the second-shaft first section 134 and the second-shaft second section 136, the brake 118 selectively enable motion of the second-shaft first section, and the starting-torque motor 112 is disengaged from the power-circulating transmission 104. The running motor 110 is engaged with the power-circulating transmission 104 and applies power to the power-circulating transmission 104 to commence the testing operation.

Referring to FIGS. 1-5 and 7-10, in one or more examples, the system 100 includes a starting-torque-motor clutch 124. The starting-torque-motor clutch 124 selectively engages or disengages the starting-torque motor 112 from the power-circulating transmission 104. The starting-torque motor 112 is engaged during application of the initial static torque. The starting-torque motor 112 is disengaged during application of power to the power-circulating transmission 104.

In one or more examples, the starting-torque motor 112 includes a pneumatic motor. In one or more examples, the starting-torque motor 112 includes a hydraulic motor. In one or more examples, the starting-torque motor 112 includes an electric motor. The starting-torque motor 112 operates at a set torque and rotational speed. The starting-torque motor 112 is configured to slowly ramp up to a targeted torque that is preselected for the type of the test article 102 being tested.

Referring to FIGS. 1-4 and 6-10, in one or more examples, the system 100 includes the running-torque motor 114. The running-torque motor 114 applies a dynamic torque load to the power-circulating transmission 104. The running-torque motor 114 is configured to apply the dynamic torque load when the power-circulating transmission 104 is in the engaged power-circulating state. In one or more examples, the running-torque motor 114 is coupled to the first shaft 126. In one or more examples, the running-torque motor 114 is coupled to one of the gears of the second gear box 132.

The dynamic torque load refers to the running or make-up torque that is applied to the mechanical drive circuit while the power-circulating transmission 104 is in the engaged power-circulating state and in a dynamic condition with power and motion being applied to the power-circulating transmission 104 by the running motor 110.

Referring to FIGS. 1-4 and 6-10, in one or more examples, the system 100 includes a running-torque-motor clutch 144. The running-torque-motor clutch 144 selectively engages or disengages the running-torque motor 114. The running-torque motor 114 is disengaged during application of the initial static torque. The running-torque motor 114 is selectively engaged or disengaged during application of power to the power-circulating transmission 104. The running-torque motor 114 is engaged during application of the dynamic running torque.

In one or more examples, the running-torque motor 114 includes a pneumatic motor. In one or more examples, the running-torque motor 114 includes a hydraulic motor. In one or more examples, the running-torque motor 114 includes an electric motor. The running-torque motor 114 operates at a set torque and rotational speed. The running-torque motor 114 is configured to apply an additional torque load on-the-fly to the power-circulating transmission 104 when it is running at the target rotational speed and the torque load within the power-circulating transmission 104 reduces due to wear in the test article 102 and/or the transmission components 106.

Referring to FIGS. 1-10, in one or more examples, the system 100 includes a torque sensor 142. The torque sensor 142 measures a torque load within the power-circulating transmission 104. In one or more examples, the torque sensor 142 measures the dynamic torque load within the power-circulating transmission 104. In one or more examples, the torque sensor 142 measures the static torque load within the power-circulating transmission 104.

In one or more examples, the torque sensor 142 is coupled to or is otherwise in operational communication with the first shaft 126. In one or more examples, the torque sensor 142 is coupled to or is otherwise in operation communication with one of the first gear box 128 or the second gear box 132. In one or more examples, the torque sensor 142 is coupled to or is otherwise in operation communication with the test article 102.

The torque sensor 142 can be any suitable type of sensor or device that measures and records the torque on a rotating system or a component thereof. In one or more examples, the torque sensor 142 is a rotary torque sensor. In one or more examples, the torque sensor 142 is a reaction torque sensor. In one or more examples, the torque sensor 142 is configured to measure stationary or static torque, such as the initial static torque load applied to the system 100. In one or more examples, the torque sensor 142 is configured to measure rotational or dynamic torque, such as the dynamic running torque of the system 100. In one or more examples, the torque sensor 142 includes more than one torque sensor and is configured to measure both stationary or static torque and rotational or dynamic torque.

Figure 10:
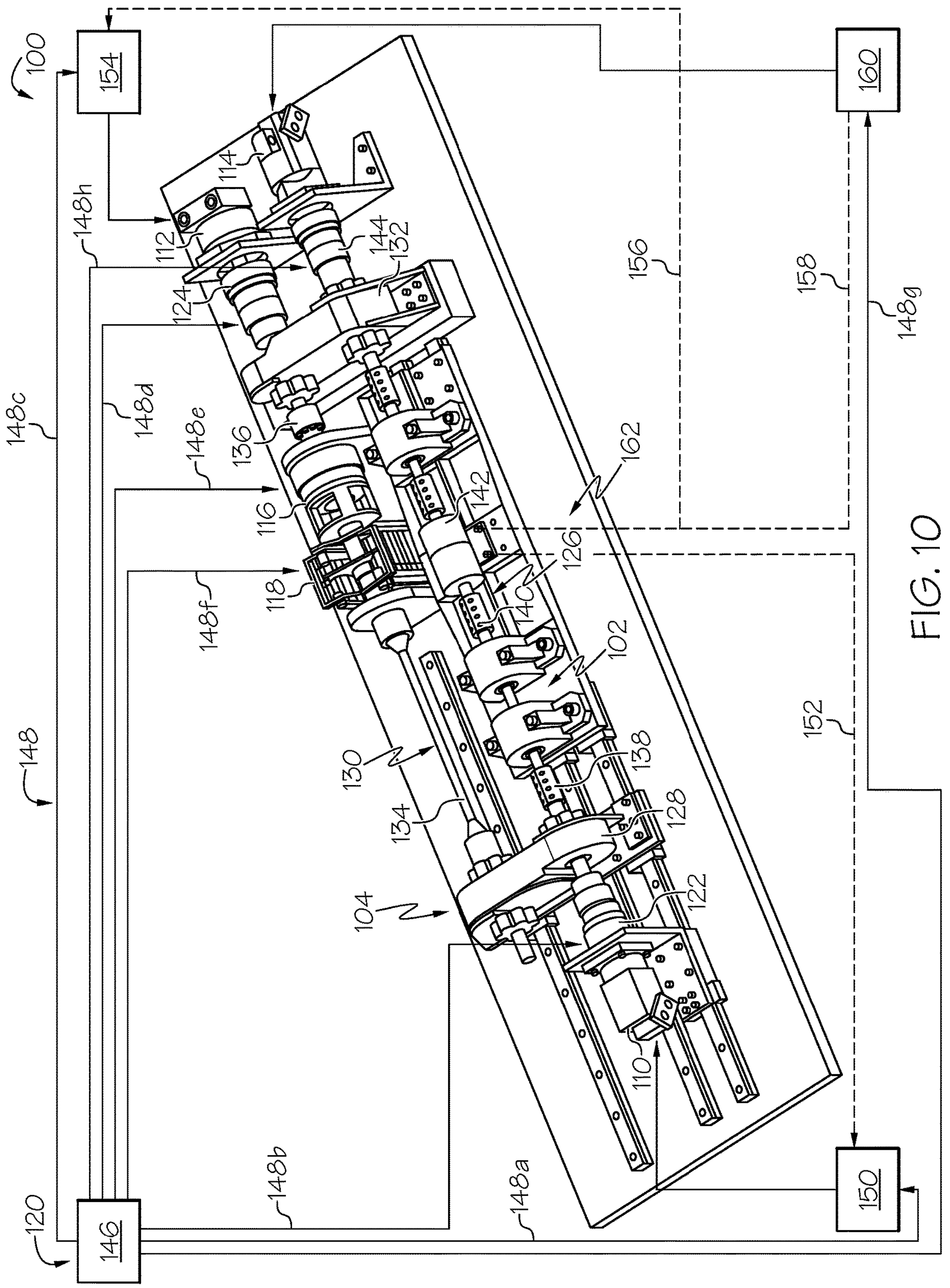
FIG. 10 is a schematic illustration of an example of a control loop for the system.

Referring to FIG. 10, in one or more examples, the system 100 includes a controller 120. The controller 120 directs operation of one or more of the operational components of the system 100. In one or more examples, the controller 120 directs operation of the running motor 110. In one or more examples, the controller 120 directs operation of the starting-torque motor 112. In one or more examples, the controller 120 directs operation of running-torque motor 114. In one or more examples, the controller 120 directs operation of the clutch 116. In one or more examples, the controller 120 directs operation of the brake 118. In one or more examples, the controller 120 directs operation of the running-motor clutch 122. In one or more examples, the controller 120 directs operation of the starting-torque-motor clutch 124. In one or more examples, the controller 120 directs operation of the running-torque-motor clutch 144.

Referring to FIG. 10, in one or more examples, the controller 120 directs operation of the running motor 110 based on signals 162 from the torque sensor 142. In one or more examples, the controller 120 directs operation of the starting-torque motor 112 based on the signals 162 from the torque sensor 142. In one or more examples, the controller 120 directs operation of the running-torque motor 114 based on the signals 162 from the torque sensor 142.

Referring to FIG. 10, in one or more examples, the controller 120 includes one or more of a master controller 146, a running-motor controller 150, a starting-torque-motor controller 154, and a running-torque-motor controller 160. The master controller 146 generates command signals 148. For example, the command signals 148 include a running-motor command signal 148*a*, a running-motor-clutch command signal 148*b*, a starting-torque-motor command signal 148*c*, a starting-torque-motor-clutch command signal 148*d*, a power-circulating-clutch command signal 148*e*, a power-circulating-brake command signal 148*f*, a running-torque-motor command signal 148*g*, and a running-torque-motor-clutch command signal 148*h*.

In one or more examples, the running-motor controller 150 controls the running motor 110 based on one of the command signals 148 (e.g., the running-motor command signal 148*a*) from the master controller 146 and an RPM signal 152 generated by and transmitted from the torque sensor 142.

In one or more examples, the starting-torque-motor controller 154 controls the starting-torque motor 112 based on one of the command signals 148 (e.g., the starting-torque-motor command signal 148*c*) from the master controller 146 and a starting-torque signal 156 generated by and transmitted from the torque sensor 142.

In one or more examples, the running-torque-motor controller 160 controls the running-torque motor 114 based on one of the command signals 148 (e.g., running-torque-motor command signal 148*g*) from the master controller 146 and a running-torque signal 158 generated by and transmitted from the torque sensor 142.

Figure 9:
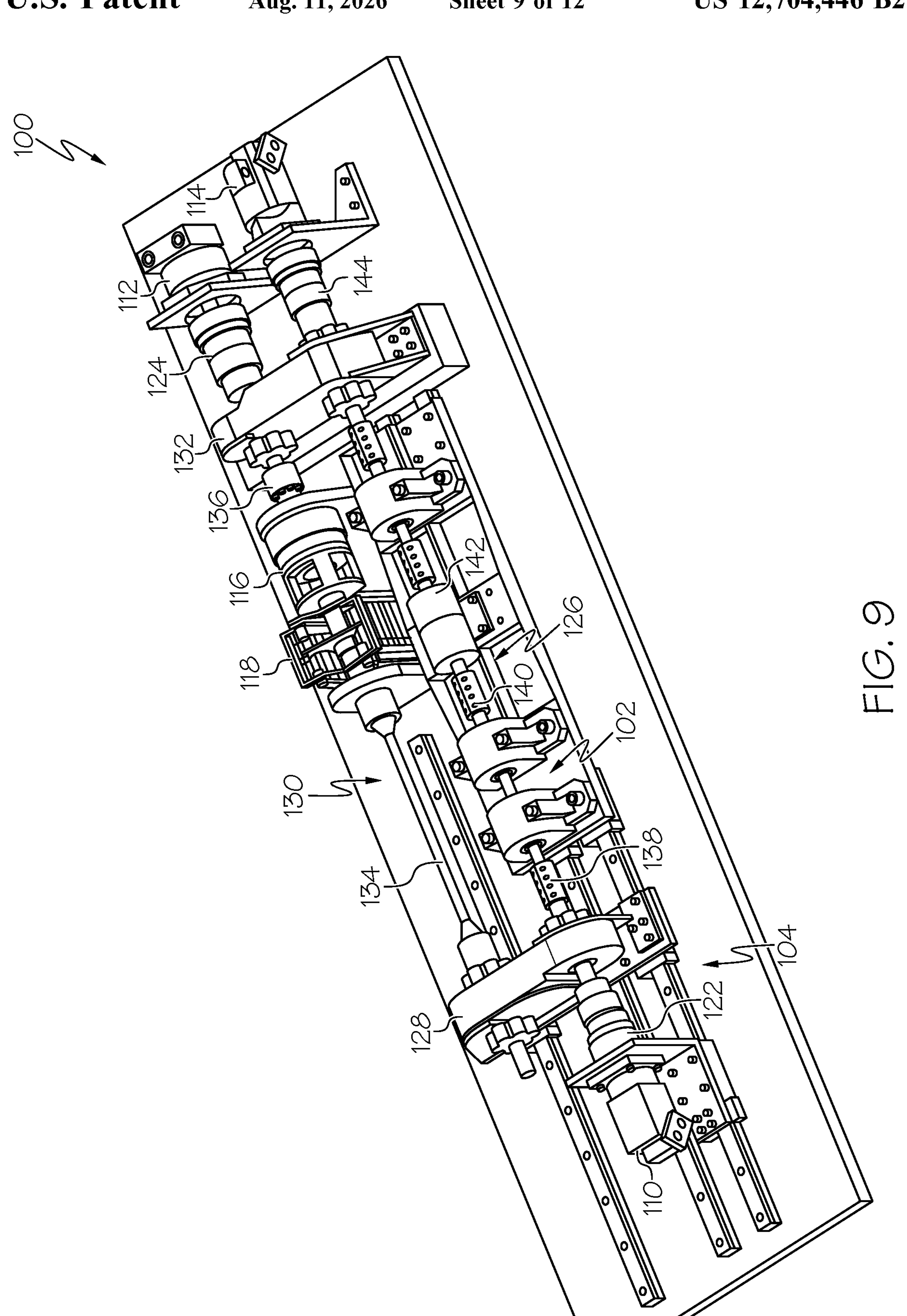
FIG. 9 is a schematic, perspective view of an example of the system.

Referring to FIG. 9, in one or more examples, the system 100 and/or the power-circulating transmission 104 can have any number of additional or alternate instances or implementations of the transmission components 106. As an example, the first shaft 126 can have any number of shaft section (e.g., in addition to the first-shaft first section 138 and the first-shaft second section 140). Mating ends of the shaft sections of the first shaft 126 can be coupled together or otherwise joined using any appropriate rotating shaft coupler. As another example, the second shaft 130 can have any number of shaft sections (e.g., in addition to the second-shaft first section 134 and the second-shaft second section 136). Mating ends of the shaft sections of the second shaft 130 can be coupled together or otherwise joined using any appropriate rotary shaft coupler. As another example, the power-circulating transmission 104 can include one or more bearings that are configured to support the first shaft 126 and/or the second shaft 130 while enabling rotation. As another example, the power-circulating transmission 104 can include various types of couplings that are configured to coupled adjacent ones of the transmission components 106 together and enable the transfer of power, motion, and torque between the transmission components 106. As yet another example, the power-circulating transmission 104 can include other bracketry or fixtures that are configured to support the various instances of the transmission components 106.

Figure 11:
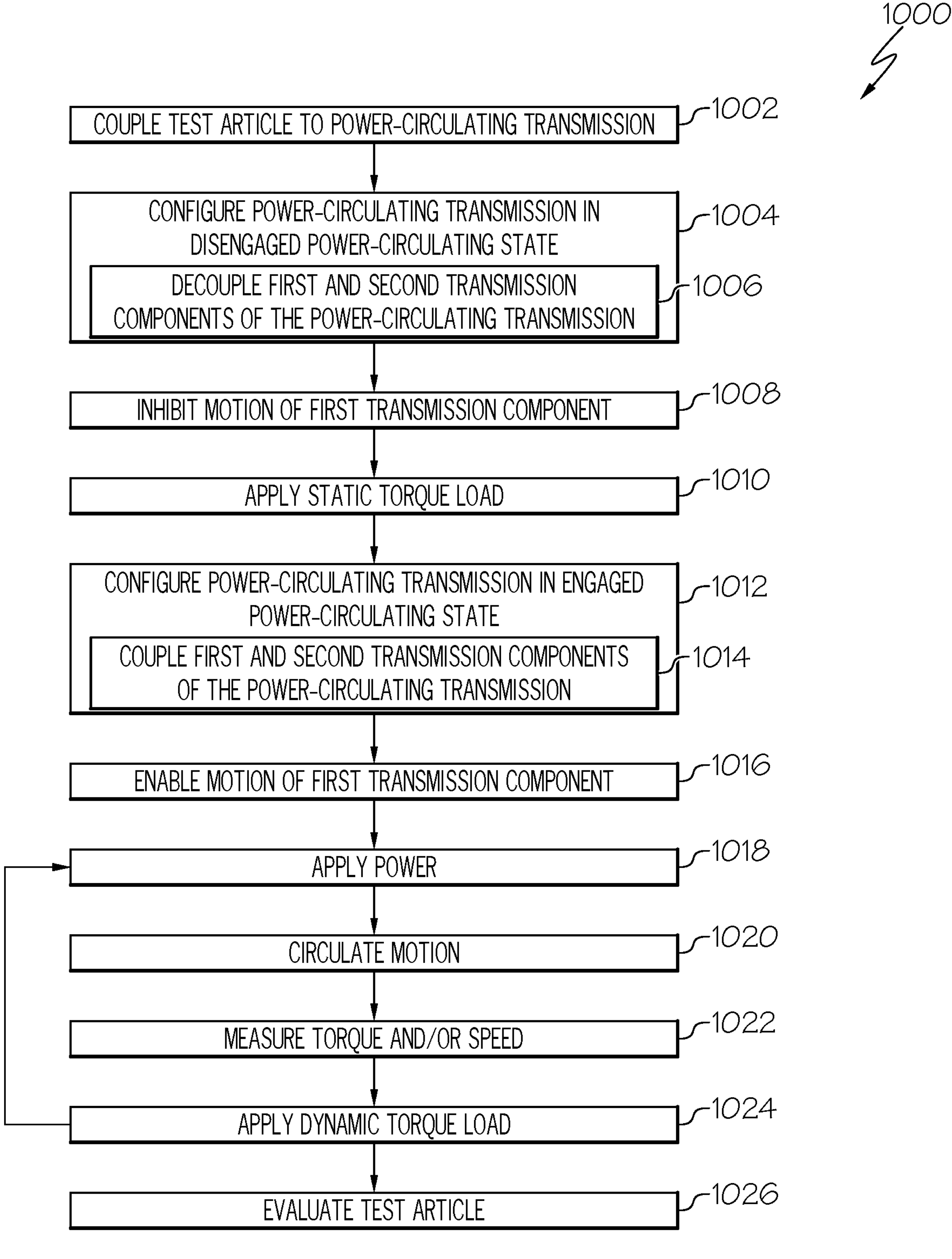
FIG. 11 is a flow diagram of an example of a method for wear testing.

Referring generally to FIGS. 1-10 and particularly to FIG. 11, disclosed are examples of the method 1000. In one or more examples, the method 1000 is implemented using the system 100 (FIG. 1-10). The following are examples of the method 1000, according to the present disclosure. Not all of the elements, steps, and/or operations described or illustrated in one example are required in that example. Some or all of the elements, steps, and/or operations described or illustrated in one example can be combined with other examples in various ways without the need to include other elements, steps, and/or operations described in those other examples, even though such combination or combinations are not explicitly described or illustrated by example herein.

In one or more examples, the method 1000 includes a step of (block 1002) coupling the test article 102 to the power-circulating transmission 104. The power-circulating transmission 104 includes a plurality of the transmission components 106 that are arranged in series to circulate motion along the continuous loop 108. The test article 102 is coupled in series and between two adjacent ones of the transmission components 106 such that the power-circulating transmission 104 and the test article 102 form a mechanical drive circuit that circulates motion along the continuous loop 108 and through the test article 102 for testing performance and/or wear.

In one or more examples, the method 1000 includes a step of (block 1004) configuring the power-circulating transmission 104 in the disengaged power-circulating state. As an example, configuring the power-circulating transmission 104 in the disengaged power-circulating state is achieved by decoupling or otherwise disconnecting any two of the transmission components 106, such as a directly adjacent pair of the transmission components 106.

In one or more examples, the method 1000, such as the step of (block 1004) configuring the power-circulating transmission 104 in the disengaged power-circulating state, includes a step of (block 1006) decoupling a first one of the transmission components 106 and a second one of the transmission components 106 such that the power-circulating transmission 104 is in the disengaged power-circulating state. As an example, the decoupling step (e.g., block 1006) includes decoupling the second-shaft first section 134 and the second-shaft second section 136 of the second shaft 130.

In one or more examples, the decoupling step (e.g., block 1006) is performed using the clutch 116. In one or more examples, the clutch 116 is selectively actuated under direction from the controller 120. Actuation of the clutch 116 selectively engages the clutch 116, thereby coupling the transmission components 106 and configuring the power-circulating transmission 104 in the engaged power-circulating state, or selectively disengages or separates the clutch 116, thereby decoupling the transmission components 106 and configuring the power-circulating transmission 104 in the disengaged power-circulating state.

In one or more examples, the method 1000 includes a step of (block 1008), with the power-circulating transmission 104 in the disengaged power-circulating state, inhibiting motion of at least one of the transmission components 106, such as the first one of the transmission components 106. As an example, the motion inhibiting step (e.g., block 1008) includes locking the second-shaft first section 134 in a fixed rotational position or orientation to inhibit rotation of the second-shaft first section 134 relative to the second-shaft second section 136.

In one or more examples, according to the method 1000, the motion inhibiting step (e.g., block 1008) is performed using the brake 118. In one or more examples, the brake 118 is selectively actuated under direction from the controller 120. Actuation of the brake 118 selectively engages the brake 118 with one of the transmission components 106, thereby inhibiting rotary motion, or selectively disengages or separates the brake 118 from the one of the transmission components 106, thereby releasing and enabling rotary motion.

In one or more examples, the method 1000 includes a step of (block 1010), with the power-circulating transmission 104 in the disengaged power-circulating state, applying a static torque load to the power-circulating transmission 104. In one or more examples, the step of (block 1010) applying the static torque load to the power-circulating transmission 104 is performed using the starting-torque motor 112.

In one or more examples, the method 1000 includes a step of (block 1012) configuring the power-circulating transmission 104 in the engaged power-circulating state. As an example, configuring the power-circulating transmission 104 in the engaged power-circulating state is achieved by coupling (e.g., recoupling) or otherwise connecting (e.g., reconnecting) the transmission components 106, such as the directly adjacent pair of the transmission components 106.

In one or more examples, the method 1000, such as the step of (block 1012) configuring the power-circulating transmission 104 in the engaged power-circulating state, includes a step of (block 1014) coupling the first one of the transmission components 106 and the second one of the transmission components 106 such that the power-circulating transmission 104 is in the engaged power-circulating state. As an example, the coupling step (e.g., block 1014) includes coupling the second-shaft first section 134 and the second-shaft second section 136 of the second shaft 130.

In one or more examples, according to the method 1000, the step of (block 1014) coupling, or recoupling, the first one of the transmission components 106 and the second one of the transmission components 106 is performed using the clutch 116. In one or more examples, the clutch 116 is selectively actuated under direction from the controller 120.

In one or more examples, the method 1000 includes a step of (block 1016), with the power-circulating transmission 104 in the engaged power-circulating state, enabling motion of the first one of the transmission components 106. As an example, the motion enabling step (e.g., block 1016) includes releasing the second-shaft first section 134 to permit rotation of the second-shaft first section 134 with the second-shaft second section 136.

In one or more examples, according to the method 1000, the motion enabling step (e.g., block 1016) is performed using the brake 118. In one or more examples, the brake 118 is selectively actuated under direction from the controller 120.

In one or more examples, the method 1000 includes a step of (block 1018), with the power-circulating transmission 104 in the engaged power-circulating state, applying power to the power-circulating transmission 104. The power applied to the power-circulating transmission 104 rotates the transmission components 106 and transmits motion along the continuous loop 108. In one or more examples, according to the method 1000, the step of (block 1018) applying power to the power-circulating transmission 104 is performed using the running motor 110.

In one or more examples, the method 1000 includes a step of (block 1020) circulating motion along the continuous loop 108. Circulating motion along the continuous loop 108 and through the closed mechanical drive circuit is performed for a desired number of cycles necessary to properly evaluate the performance and/or wear properties of the test article 102.

In one or more examples, the method 1000 includes a step of (block 1022) measuring at least one of the torque within the power-circulating transmission 104 and/or the rotational speed (e.g., RPM) of one or more of the transmission components 106 of the power-circulating transmission 104. In one or more examples, the measuring step (e.g., block 1022) includes a step of measuring the static torque load within the power-circulating transmission 104. In one or more examples, the measuring step (e.g., block 1022) includes a step of measuring the dynamic torque load within the power-circulating transmission 104. In one or more examples, the measuring step (e.g., block 1022) includes a step of measuring the rotational speed within the power-circulating transmission 104.

In one or more examples, the measuring step (e.g., block 1022) is performed using the torque sensor 142. The torque sensor 142 is in communication with the controller 120, such as the running-motor controller 150, the motor controller 154, and/or the motor controller 160 and provides appropriate sensor signals used by the controller 120 as closed-loop feedback for directing operational parameters (e.g., speed and/or torque) of the running motor 110, the starting-torque-motor controller 154, and/or the running-torque-motor controller 160.

In one or more examples, the method 1000 includes a step of (block 1024), with the power-circulating transmission 104 in the engaged power-circulating state and power being applied, applying a dynamic torque load to the power-circulating transmission 104. In one or more examples, the dynamic torque load is applied using the running-torque motor 114. The dynamic torque is applied, as needed, for example, based on the measurements (e.g., block 1022) from the torque sensor 142, to compensate for losses in the power-circulating transmission 104 due to wear and cycling.

In one or more examples, the method 1000 includes a step of (block 1026) evaluating the test article 102 after a desired number of cycles. The evaluating step (e.g., block 1026) can include evaluating performance over time, wear over time, resistance to wear, and the like.

Figures 12, 13:
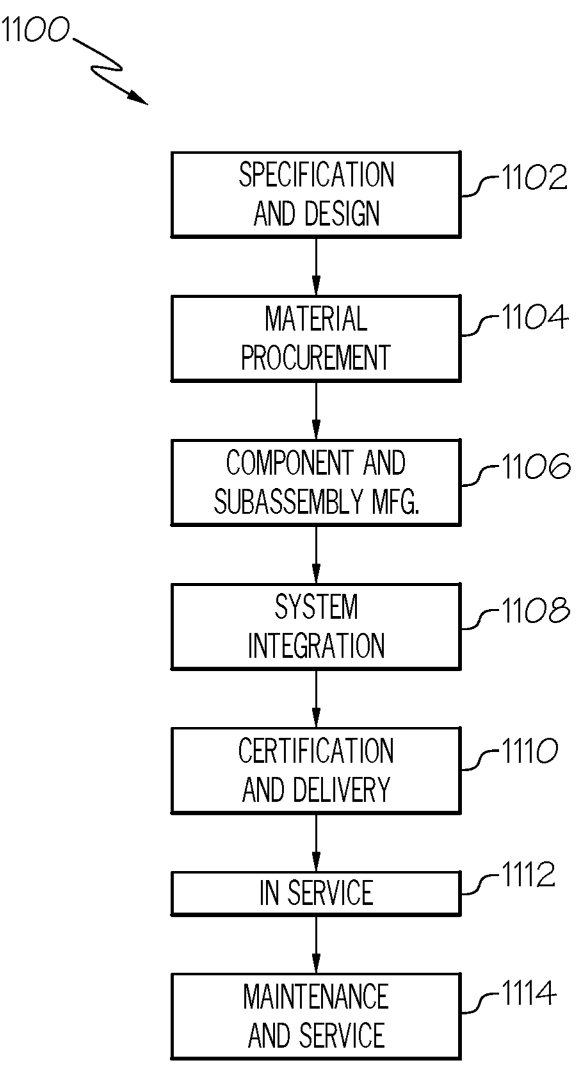
FIG. 12 is a flow diagram of an example of an aircraft manufacturing and service method.
FIG. 13 is a schematic block diagram of an example of an aircraft.

Referring now to FIGS. 12 and 13, examples of the system 100 and the method 1000 described herein, may be related to, or used in the context of, the aircraft manufacturing and service method 1100, as shown in the flow diagram of FIG. 12 and the aircraft 1200, as schematically illustrated in FIG. 13. As an example, the aircraft 1200 and/or the aircraft production and service method 1100 may include or utilize the system 100 and/or the method 1000 for conveying gas, such as air, to desired spaces during manufacture or during service.

Referring to FIG. 13, which illustrates an example of the aircraft 1200. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In one or more examples, the onboard systems 1204 include various flight control systems 1216 (e.g., drive systems and secondary flight controls such as slats, flaps, and other high-lift systems) and other mechanical systems (e.g., doors, landing gear, etc.), which typically include various types of power-transmission, torque-transmission, and motion-transmission assemblies and components. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. The aircraft 1200 can have any number of components that includes a power-transmission assembly, a motion-transmission assembly, or a torque-transmission assembly that are evaluated using the system 100 or according to the method 1000.

Referring to FIG. 12, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 12 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000 shown and described herein, may be employed during any one or more of the stages of the manufacturing and service method 1100 shown in the flow diagram illustrated by FIG. 12. In an example, components of the aircraft 1200 can be evaluated using the system 100 and/or according to the method 1000 during a portion of component and subassembly manufacturing (block 1106) and/or system integration (block 1108). Further, components can be evaluated using the system 100 and/or according to the method 1000 while the aircraft 1200 is in service (block 1112). Also, components can be evaluated using the system 100 and/or according to the method 1000 during system integration (block 1108) and certification and delivery (block 1110). Similarly, components can be evaluated using the system 100 and/or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-10 and 13, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-10 and 13, referred to above, need be included in every example and not all elements, features, and/or components described herein are necessarily depicted in each illustrative example. Accordingly, some of the elements, features, and/or components described and illustrated in FIGS. 1-10 and 13 may be combined in various ways without the need to include other features described and illustrated in FIGS. 1-10 and 13, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-10 and 13, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-10 and 13, and such elements, features, and/or components may not be discussed in detail herein with reference to each of FIGS. 1-10 and 13. Similarly, all elements, features, and/or components may not be labeled in each of FIGS. 1-10 and 13, but reference numerals associated therewith may be utilized herein for consistency.

In FIGS. 11 and 12, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 11 and 12 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100 and the method 1000 have been shown and described, modifications may occur to those skilled in the art upon reading the specification. The present application includes such modifications and is limited only by the scope of the claims.

What is claimed is:

1. A system for testing wear of a test article, the system comprising:

a power-circulating transmission comprising a plurality of transmission components that are arranged in series to circulate motion along a continuous loop, wherein the test article is coupled to the power-circulating transmission along the continuous loop;

a clutch to selectively couple or decouple a first one of the transmission components and a second one of the transmission components such that the power-circulating transmission is in an engaged power-circulating state or a disengaged power-circulating state;

a brake to selectively inhibit motion of the first one of the transmission components when the power-circulating transmission is in the disengaged power-circulating state;

a starting-torque motor that applies a static torque load to the power-circulating transmission by rotating the second one of the transmission components relative to the first one of the transmission components that is held stationary by the brake when the power-circulating transmission is in the disengaged power-circulating state; and a running motor that applies power to the power-circulating transmission to drive the motion along the continuous loop when the power-circulating transmission is in the engaged power-circulating state.

2. The system of claim 1, wherein:

the plurality of transmission components of the power-circulating transmission comprises:

a first gear box;

a second gear box;

a first shaft extending between and coupled to the first gear box and the second gear box;

a second shaft extending between and coupled to the first gear box and the second gear box;

the running motor is coupled to the first shaft;

the starting-torque motor is coupled to the second shaft;

the second shaft comprises a second-shaft first section and a second-shaft second section;

the clutch selectively couples or decouples the second-shaft first section and the second-shaft second section; and the brake selectively enables or inhibits motion of the second-shaft first section relative to the second-shaft second section.

3. The system of claim 2, wherein the test article is integrated within one of the first gear box or the second gear box.

4. The system of claim 2, wherein:

the first shaft comprises a first-shaft first section and a first-shaft second section; and the test article is coupled between the first-shaft first section and the first-shaft second section.

5. The system of claim 1, further comprising a running-torque motor that applies a dynamic torque load to the power-circulating transmission when the power-circulating transmission is in the engaged power-circulating state.

6. The system of claim 5, further comprising a controller, wherein the controller:

directs operation of the running motor;

directs operation of the starting-torque motor; and directs operation of the running-torque motor.

7. The system of claim 6, wherein the controller:

directs operation of the clutch; and directs operation of the brake.

8. The system of claim 6, further comprising a torque sensor that measures a torque load within the power-circulating transmission.

9. The system of claim 8, wherein the controller comprises:

a master controller that generates command signals;

a running-motor controller that controls the running motor based on one of the command signals from the master controller and an RPM signal from the torque sensor;

a starting-torque-motor controller that controls the starting-torque motor based on one of the command signals from the master controller and a starting-torque signal from the torque sensor; and a running-torque-motor controller that controls the running-torque motor based on one of the command signals from the master controller and a running-torque signal from the torque sensor.

10. A system for testing wear of a test article, the system comprising:

a power-circulating transmission comprising a plurality of transmission components that are arranged in series to circulate motion along a continuous loop, wherein the test article is coupled to the power-circulating transmission along the continuous loop;

a starting-torque motor that applies a static torque load to the power-circulating transmission when the power-circulating transmission is in a disengaged power-circulating state to induce torsional load;

a running motor that applies power to the power-circulating transmission to drive the motion along the continuous loop when the power-circulating transmission is in an engaged power-circulating state; and a running-torque motor that applies a dynamic torque load to the power-circulating transmission when the power-circulating transmission is in the engaged power-circulating state to compensate for torque losses due to wear during operation.

11. The system of claim 10, wherein:

the plurality of transmission components of the power-circulating transmission comprises:

a first gear box;

a second gear box;

a first shaft extending between and coupled to the first gear box and the second gear box;

a second shaft extending between and coupled to the first gear box and the second gear box;

the running motor is coupled to the first shaft;

the running-torque motor is coupled to the first shaft; and the second shaft comprises a second-shaft first section and a second-shaft second section.

12. The system of claim 11, wherein the test article is integrated within one of the first gear box or the second gear box.

13. The system of claim 12, further comprising a torque sensor that measures at least one of a torque load and a rotational speed within the power-circulating transmission.

14. The system of claim 11, wherein:

the first shaft comprises a first-shaft first section and a first-shaft second section; and the test article is coupled between the first-shaft first section and the first-shaft second section.

15. The system of claim 13, further comprising a controller, wherein the controller:

directs operation of the running motor based on signals from the torque sensor; and directs operation of the running-torque motor based on the signals from the torque sensor.

16. The system of claim 15, wherein the starting-torque motor applies the static torque load to the power-circulating transmission by rotating the second-shaft second section relative to the second-shaft first section that is held stationary.

17. The system of claim 16, further comprising:

a clutch to selectively couple or decouple the second-shaft first section and the second-shaft second section such that the power-circulating transmission is in the engaged power-circulating state or the disengaged power-circulating state; and a brake to selectively inhibit motion of the second-shaft first section relative to the second-shaft second section when the power-circulating transmission is in the disengaged power-circulating state.

18. The system of claim 16, wherein the controller directs operation of the starting-torque motor based on the signals from the torque sensor.

19. A method for testing wear of a test article, the method comprising:

coupling the test article to a power-circulating transmission comprising a plurality of transmission components that are arranged in series to circulate motion along a continuous loop;

decoupling a first one of the transmission components and a second one of the transmission components such that the power-circulating transmission is in a disengaged power-circulating state;

with the power-circulating transmission in the disengaged power-circulating state, inhibiting motion of the first one of the transmission components;

with the power-circulating transmission in the disengaged power-circulating state, applying a static torque load to the power-circulating transmission using a starting-torque motor by rotating the second one of the transmissions component relative to the first one of the transmission components;

coupling the first one of the transmission components and the second one of the transmission components such that the power-circulating transmission is in an engaged power-circulating state;

with the power-circulating transmission in the engaged power-circulating state, enabling motion of the first one of the transmission components;

with the power-circulating transmission in the engaged power-circulating state, applying power to the power-circulating transmission using a running motor; and circulating motion along the continuous loop.

20. The method of claim 19, further comprising, with the power-circulating transmission in the engaged power-circulating state, applying a dynamic torque load to the power-circulating transmission using a running-torque motor.

* * * * *